US011563223B2

(12) United States Patent
Inoue et al.

(10) Patent No.: US 11,563,223 B2
(45) Date of Patent: Jan. 24, 2023

(54) METHOD OF STARTING OPERATION OF FUEL CELL SYSTEM AT LOW TEMPERATURE, AND THE FUEL CELL SYSTEM

(71) Applicant: HONDA MOTOR CO., LTD., Tokyo (JP)

(72) Inventors: Kazuhide Inoue, Wako (JP); Jumpei Ogawa, Wako (JP); Nobuki Koiwa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 202 days.

(21) Appl. No.: 17/023,984

(22) Filed: Sep. 17, 2020

(65) Prior Publication Data

US 2021/0091394 A1    Mar. 25, 2021

(30) Foreign Application Priority Data

Sep. 20, 2019  (JP) .............................. JP2019-171757

(51) Int. Cl.
*H01M 8/04*      (2016.01)
*H01M 8/04223*   (2016.01)
*H01M 8/04089*   (2016.01)
*H01M 8/04225*   (2016.01)
*H01M 8/04701*   (2016.01)
*H01M 8/04302*   (2016.01)
*H01M 8/0432*    (2016.01)

(52) U.S. Cl.
CPC ..... *H01M 8/04253* (2013.01); *H01M 8/0432* (2013.01); *H01M 8/04097* (2013.01); *H01M 8/04225* (2016.02); *H01M 8/04231* (2013.01); *H01M 8/04302* (2016.02); *H01M 8/04701* (2013.01)

(58) Field of Classification Search
CPC ......... H01M 8/04253; H01M 8/04225; H01M 8/04302; H01M 8/04097; H01M 8/04231; H01M 8/0432; H01M 8/04701
USPC ......................................................... 429/415
See application file for complete search history.

(56) References Cited

U.S. PATENT DOCUMENTS

| 2011/0171548 | A1* | 7/2011 | Matsumoto ....... H01M 8/04231 429/429 |
| 2015/0349360 | A1* | 12/2015 | Hoshi ............... H01M 8/04268 429/429 |
| 2016/0365587 | A1* | 12/2016 | Usami ............... H01M 8/04089 |

(Continued)

FOREIGN PATENT DOCUMENTS

JP          5003073 B2     8/2012

*Primary Examiner* — James M Erwin
(74) *Attorney, Agent, or Firm* — Carrier Blackman & Associates, P.C.; Joseph P. Carrier; Fulchand P. Shende

(57) ABSTRACT

A fuel cell system includes a fuel cell stack, an anode system apparatus, a control unit, an anode outlet temperature sensor, and a purge valve. In a method of starting operation of the fuel cell system at low temperature, a control unit compares a predetermined freezing temperature threshold value with an anode outlet temperature detected by an anode outlet temperature sensor. Then, the control unit performs low temperature control to place the purge valve in the constantly open state in the case where the temperature is not higher than the freezing temperature threshold value, and performs normal control for switching opening/closing of the purge valve in the case where the temperature exceeds the freezing temperature threshold value.

11 Claims, 5 Drawing Sheets

(56) References Cited

U.S. PATENT DOCUMENTS

| | | | |
|---|---|---|---|
| 2016/0380282 A1* | 12/2016 | Maruo | B60L 58/31 |
| | | | 429/414 |
| 2018/0277863 A1* | 9/2018 | Ogawa | H01M 8/04179 |
| 2019/0081337 A1* | 3/2019 | Riley | H01M 8/04104 |
| 2019/0084442 A1* | 3/2019 | Darrenkamp | H01M 8/04164 |
| 2019/0165390 A1* | 5/2019 | Okamura | H01M 8/04753 |

* cited by examiner

METHOD OF STARTING OPERATION OF FUEL CELL SYSTEM AT LOW TEMPERATURE, AND THE FUEL CELL SYSTEM

CROSS-REFERENCE TO RELATED APPLICATION

This application is based upon and claims the benefit of priority from Japanese Patent Application No. 2019-171757 filed on Sep. 20, 2019, the contents of which are incorporated herein by reference.

BACKGROUND OF THE INVENTION

Field of the Invention

The present invention relates to a method of starting operation of a fuel cell system at low temperature, and the fuel cell system.

Description of the Related Art

The fuel cell system supplies an anode gas from the anode system apparatus to a fuel cell stack, and supplies a cathode gas from a cathode system apparatus to the fuel cell stack to perform power generation in the fuel cell stack. The fuel cell stack discharges, as the anode off gas, unreacted anode gas, and water produced during power generation (water vapor, condensed water) from the anode system apparatus through the purge valve (see Japanese Patent No. 5003073). Further, the anode system apparatus disclosed in Japanese Patent No. 5003073 forms an anode circulation circuit for circulating the anode gas between the fuel cell stack and the anode system apparatus.

SUMMARY OF THE INVENTION

In the fuel cell system of this type, at the time of starting operation in a low temperature environment (below freezing temperature), water vapor in the anode off gas discharged from the fuel cell stack is cooled rapidly outside the stack, and an orifice in a purge valve may be closed. If the orifice in the purge valve is frozen, nitrogen contained in the anode gas cannot be discharged from the purge valve, and the nitrogen concentration on the anode side of the fuel cell is increased, and hydrogen concentration is decreased relatively. In some cases, power generation of the fuel cell stack cannot be performed due to the shortage of hydrogen on the part of the anode.

In particular, in the conventional fuel cell system, since opening/closing of the purge valve is switched regardless of the closed state of the orifice at the time of starting operation at low temperature, it is not possible to smoothly perform control in correspondence with the state of the closure orifice and adjustment of hydrogen concentration after releasing the blocking state.

The present invention has been made to solve the above problem, and an object of the present invention is to provide a method of starting operation of a fuel cell system at low temperature, and the fuel cell system in which it is possible to suitably perform power generation of the fuel cell stack even in the case of starting operation of the fuel cell stack at low temperature.

In order to achieve the above object, according to a first aspect of the present invention, a method of starting operation of a fuel cell system at low temperature is provided. The fuel cell system includes a fuel cell stack, an anode system apparatus configured to circulate an anode gas between the fuel cell stack and the anode system apparatus, and a purge valve provided in an anode circulation circuit of the anode system apparatus. The purge valve has an orifice for allowing the anode off gas discharged from the fuel cell stack to flow through the orifice. The method includes the steps of detecting the temperature of the fuel cell system by a temperature sensor, comparing a predetermined freezing temperature threshold value with the detected temperature by a control unit, and performing low temperature control to place the purge valve in a constantly open state in the case where the temperature is not higher than the freezing temperature threshold value, and performing normal control for switching opening/closing of the purge valve in the case where the temperature exceeds the freezing temperature threshold value.

In order to achieve the above object, according to a second aspect of the present invention, a fuel cell system is provided. The fuel cell system includes a fuel cell stack, an anode system apparatus configured to circulate an anode gas between the fuel cell stack and the anode system apparatus, and a purge valve provided in an anode circulation circuit of the anode system apparatus. The purge valve has an orifice for allowing the anode off gas discharged from the fuel cell stack to flow through the orifice. Further, the fuel cell system includes a control unit configured to control opening/closing of the purge valve, and a temperature sensor configured to detect temperature of the fuel cell system. The control unit is configured to compare a predetermined freezing temperature threshold value with the detected temperature, perform low temperature control to place the purge valve in a constantly open state in the case where the temperature is not higher than the freezing temperature threshold value, and perform normal control for switching opening/closing of the purge valve in the case where the temperature exceeds the freezing temperature threshold value.

In the method of starting operation of the fuel cell system at low temperature and the fuel cell system, in the case where the temperature of the temperature sensor is not higher than the freezing temperature threshold, the purge valve is placed in the constantly open state to make it possible to suitably perform power generation even at the time of starting operation at low temperature. That is, in the fuel cell system, before the orifice is closed by the ice particles produced in the anode off gas in the low temperature control, it becomes possible to continuously and smoothly discharge the anode off gas from the purge valve. Therefore, at the stage of closing the orifice, the hydrogen concentration of the anode circulation circuit becomes sufficiently high, and the fuel cell stack can stably perform power generation by hydrogen of the anode circulation circuit.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Hereinafter, a preferred embodiment of the present invention will be described in detail with reference to the accompanying drawings.

Figure 1:
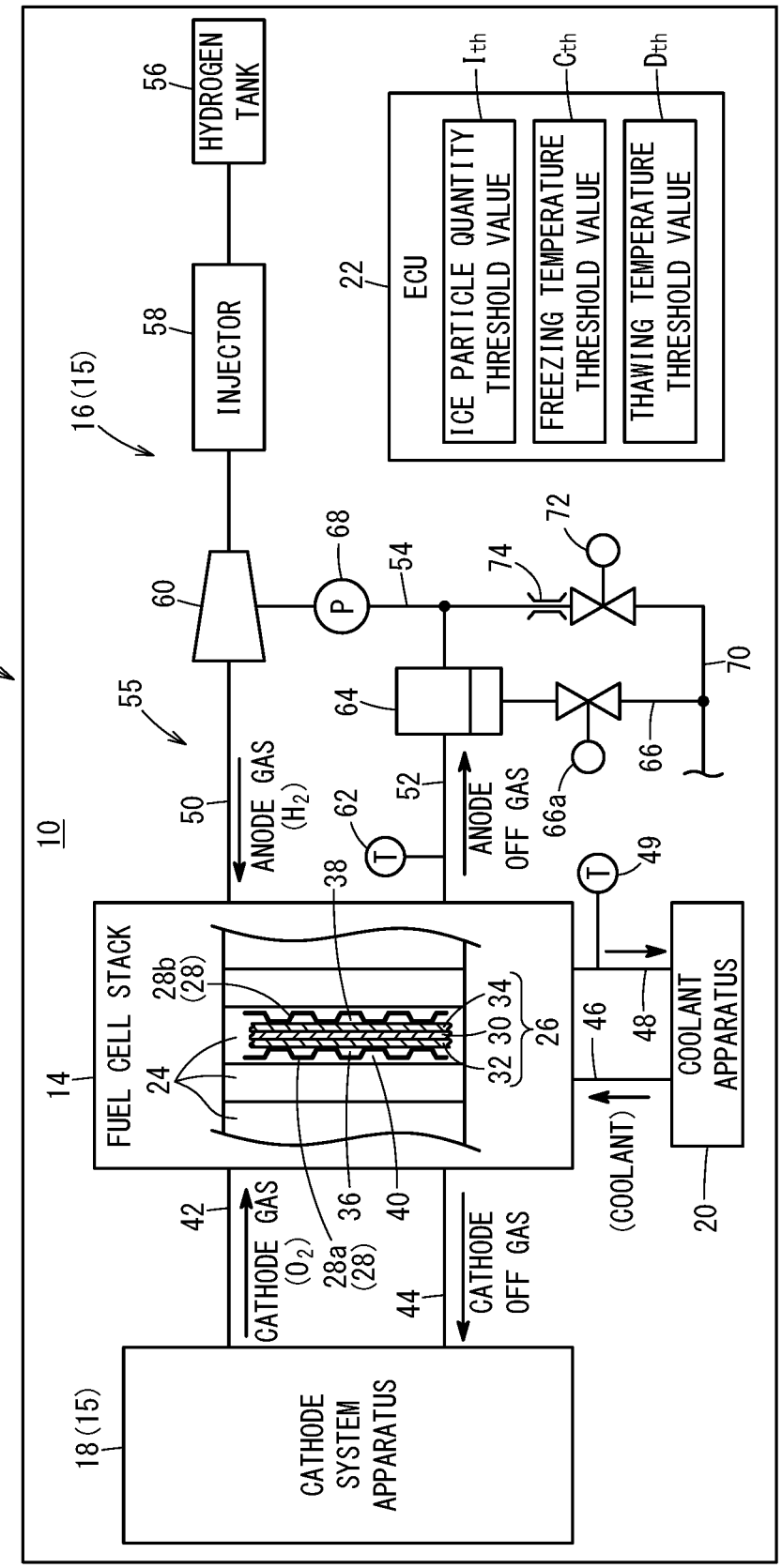
FIG. 1 is a block diagram showing overall structure of a fuel cell system according to an embodiment of the present invention.

As shown in FIG. 1, a fuel cell system 10 according to an embodiment of the present invention is mounted in a fuel cell vehicle 12 (fuel cell automobile: hereinafter simply referred to as the "vehicle 12"). This fuel cell system 10 includes a fuel cell stack 14, a reactant gas system apparatuses 15 (an anode system apparatus 16, and a cathode system apparatus 18), a coolant apparatus 20, and a control unit 22 (ECU: Electronic Control Unit).

The fuel cell stack 14 includes a plurality of power generation cells 24 for performing power generation by electrochemical reactions of an anode gas (fuel gas such as a hydrogen gas) supplied from the anode system apparatus 16, and a cathode gas (oxygen-containing gas such as the air) supplied from the cathode system apparatus 18. The plurality of power generation cells 24 are stacked together in the vehicle width direction of the vehicle 12 in a manner that electrode surfaces are oriented upright. It should be noted that the plurality of power generation cells 24 are stacked together in the front/rear direction and the gravity direction of the vehicle 12.

Each of the power generation cells 24 is made up of a membrane electrode assembly 26 (hereinafter referred to as the "MEA 26"), and two separators 28 (a first separator 28a and a second separator 28b) sandwiching the MEA 26). The MEA 26 includes an electrolyte membrane 30 (e.g., solid polymer electrolyte membrane (cation ion exchange membrane)), an anode 32 provided on one surface of the electrolyte membrane 30, and a cathode 34 provided on the other surface of the electrolyte membrane 30. The first separator 28a has an anode flow field 36 as a passage of an anode gas, on its surface facing the anode 32. The second separator 28b has a cathode flow field 38 as a passage of a cathode gas, on its surface facing the cathode 34. Further, a coolant flow field 40 as a passage of a coolant is formed on surfaces of the first and second separators 28a, 28b which face each other.

Further, the fuel cell stack 14 includes a plurality of fluid passages (not shown) for allowing the anode gas, the cathode gas, and the coolant to flow in the stacking direction of the power generation cells 24 and flow into/out of the anode flow field 36, the cathode flow field 38, and the coolant flow field 40. The fluid passages are connected to pipes of the anode system apparatus 16, the cathode system apparatus 18, and the coolant apparatus 20 connected to the fuel cell stack 14.

Pipes of the cathode system apparatus 18 include a cathode supply pipe 42 for supplying the cathode gas to the fuel cell stack 14, and a cathode discharge pipe 44 for discharging the cathode off gas consumed in power generation in the fuel cell stack 14.

Further, pipes of the coolant apparatus 20 includes a coolant supply pipe 46 for supplying a coolant to the fuel cell stack 14 and a coolant discharge pipe 48 for discharging the coolant from the fuel cell stack 14. A coolant outlet temperature sensor 49 is provided in a coolant discharge pipe 48 for detecting the temperature of the coolant discharged from the fuel cell stack 14. The coolant outlet temperature sensor 49 is provided at a position adjacent to the fuel cell stack 14, and detects the temperature of the coolant used for adjusting the temperature of the power generation cells 24. In effect, it is possible to regard that the temperature of the fuel cell stack 14 itself is detected. It should be noted that the fuel cell system 10 directly detects the temperature of the fuel cell stack 14 itself.

Pipes of the anode system apparatus 16 includes an anode supply pipe 50 for supplying an anode gas to the fuel cell stack 14 and an anode discharge pipe 52 for discharging the anode off gas consumed in power generation of the fuel cell stack 14. Further, a bypass pipe 54 for returning the hydrogen gas (anode gas) contained in the anode off gas of the anode discharge pipe 52 to the anode supply pipe 50 is connected between the anode supply pipe 50 and the anode discharge pipe 52. That is, the fuel cell system 10 forms an anode circulation circuit 55 for circulating the anode gas by the fuel cell stack 14, the anode supply pipe 50, the anode discharge pipe 52, and the bypass pipe 54.

Further, auxiliary devices of the anode system apparatus 16 for supplying the anode gas to the fuel cell stack 14 include a hydrogen tank 56, an injector 58, and an ejector 60 from the upstream side to the downstream side of the anode supply pipe 50. The hydrogen tank 56 is connected to one end of the anode supply pipe 50, for supplying the anode gas (high pressure hydrogen gas) stored in the hydrogen tank 56 to the anode supply pipe 50. The injector 58 injects the anode gas having the pressure reduced on the upstream of the anode supply pipe 50, toward the downstream side at a predetermined injection pressure. The ejector 60 sucks the anode gas from the bypass pipe 54, and supplies the anode gas to the fuel cell stack 14 on the downstream side, based on the negative pressure generated by the flow of the anode gas injected from the injector 58.

Further, auxiliary devices of the anode system apparatus 16 for discharging the anode off gas from the fuel cell stack 14 include an anode outlet temperature sensor 62 and a gas liquid separator 64 provided for the anode discharge pipe 52. The anode outlet temperature sensor 62 is provided adjacent to the fuel cell stack 14, and detects the temperature of the anode off gas discharged from the fuel cell stack 14.

The gas liquid separator 64 separates the contents of the anode off gas, into an unreacted hydrogen gas (gas) which has not been consumed in power generation and a nitrogen gas which has permeated from the cathode side through the electrolyte membrane 30 into the gas liquid separator 64, and the water (liquid) produced in power generation of the fuel cell stack 14. A bypass pipe 54 is connected to the gas liquid separator 64, and a water discharge pipe 66 is connected to the gas liquid separator 64 through a water discharge valve 66a.

Further, a pump 68 for circulating the anode off gas in the anode discharge pipe 52 (gas liquid separator 64) into the anode supply pipe 50 is provided for the bypass pipe 54. Further, a purge pipe 70 is connected to a position between the gas liquid separator 64 and the pump 68 in the bypass pipe 54. The purge pipe 70 is merged with the water discharge pipe 66, and extends up to a discharge part (not shown) of the vehicle 12, and discharges the anode off gas which passed through the gas liquid separator 64.

A purge valve 72 for opening/closing the channel of the purge pipe 70 is provided for the purge pipe 70. That is, the fuel cell system 10 opens the purge valve 72 to discharge the anode off gas from the anode circulation circuit 55, and closes the purge valve 72 to circulate the anode gas in the anode circulation circuit 55.

This purge valve 72 has a plunger and/or a diaphragm, etc. (not shown) for opening/closing a channel 72a inside the purge valve 72. Further, the purge valve 72 has an orifice 74 (narrowed part) adjacent to the opening/closing position of the channel 72a, where the channel cross sectional area (diameter) is smaller than the other part of the channel 72a. In FIG. 1, for convenience, the orifice 74 is depicted near the purge valve 72. The orifice 74 is configured to increase the flow velocity of the anode off gas, and reduce the pressure.

Further, the control unit 22 of the fuel cell system 10 starts operation of the fuel cell system 10 based on start-up operation of the vehicle 12, controls operation of each of the apparatuses (the anode system apparatus 16, the cathode system apparatus 18, and the coolant apparatus 20), and performs power generation of the fuel cell stack 14. The control unit 22 is in the form of a computer including a processor (not shown), a memory (not shown), and an input/output interface (not shown).

Operation of the above fuel cell system 10 is started also in the case where the vehicle 12 is under the low temperature environment (e.g., −10° C. or less) to perform power generation by the fuel cell stack 14. The control unit 22 establishes a predetermined function unit (not shown) by executing a program stored in a memory by a processor, to perform a method of starting operation at low temperature. Next, phenomenon which occurs in the purge valve 72 of the anode circulation circuit 55, at the time of starting operation of the fuel cell system 10 at low temperature will be described.

In the fuel cell stack 14, water is produced in reactions of the anode gas and the cathode gas during power generation. Some of the produced water is condensed inside the fuel cell stack 14 in the liquid state. The remaining water in the form of vapor (gas) which is mixed with the anode off gas is discharged from the fuel cell stack 14.

Figure 2A:
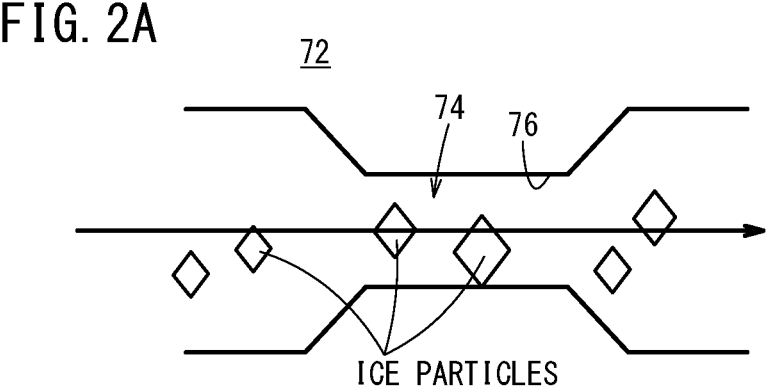
FIG. 2A is a first view showing the state of ice particles in an orifice.

In this regard, at the time of starting operation at low temperature, the anode off gas containing water vapor is rapidly cooled when the anode off gas is discharged from the fuel cell stack 14 due to the temperature difference between the fuel cell stack 14 and the and the auxiliary devices including the anode discharge pipe 52 of the anode system apparatus 16. As a result, as shown in FIG. 2A, minute ice particles are produced in the anode off gas (water vapor sublimates), and the ice particles float, and move inside the anode circulation circuit 55. After this ice particles enter the purge pipe 70, the ice particles flow into the purge valve 72 provided for the purge pipe 70 as well. Further, at the initial stage when operation is started at low temperature, since the temperature of the purge valve 72 including the orifice 74 is low, the floating ice particles and passes through the orifice 74 together with the anode off gas.

Figure 2B:
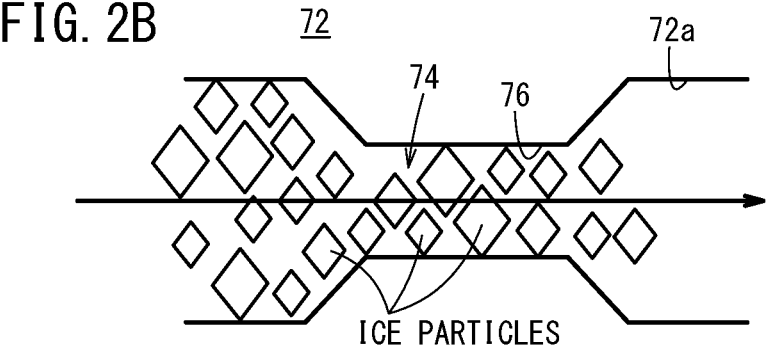
FIG. 2B is a second view showing the state of ice particles in the orifice.

As temperature of the purge valve 72 (orifice 74) increases by driving the fuel cell system 10, as shown in FIG. 2B, some of the ice particles are melt, and adhered to a wall 76 surrounding the orifice 74. As a result, the other ice particles land on the wall 76. Therefore, the ice particles are accumulated on the orifice 74 to reach phenomenon where the ice particles gradually close the orifice 74 (clogging, reduction of the channel cross sectional area of the orifice 74).

Figure 2C:
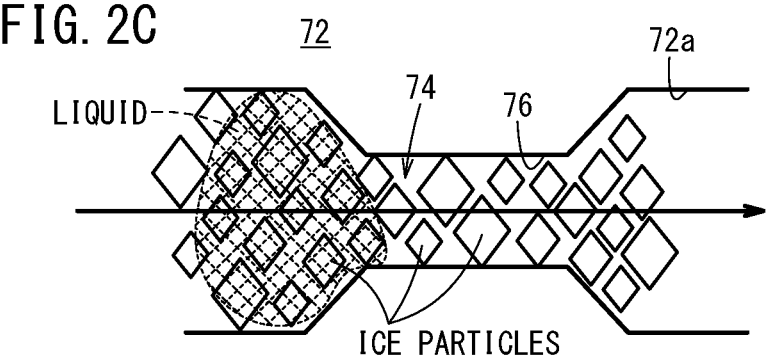
FIG. 2C is a third view showing the state of ice particles in the orifice.

Further, when the temperature of the orifice 74 continues to be increased, as shown in FIG. 2C, the ice particles which land on the inlet side of the orifice 74 are melt, and the ice particles land on the outlet side of the orifice 74. In this state, the liquid of the melt ice particles are retained by the ice particles which have been clogged in the orifice 74. As a result, the orifice 74 is completely closed or blocked. Under the phenomenon, the anode off gas can no longer be discharged from the purge valve 72.

Figure 2D:
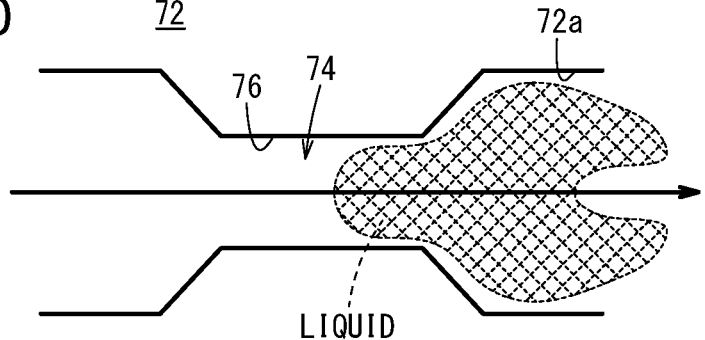
FIG. 2D is a fourth view showing the state of ice particles in the orifice.

Further, when the temperature of the orifice 74 is increased further as a result of driving of the fuel cell system 10, as shown in FIG. 2D, the ice particles which blocked the orifice 74 are almost thawed into liquid water. Therefore, in the purge valve 72, the anode off gas can flow through the orifice 74, and the anode off gas discharges the defrosted liquid from the orifice 74.

Therefore, in the fuel cell system 10, after the state shown in FIG. 2D, discharging of the anode off gas, and the stop of discharging of the anode off gas are switched by the purge valve 72. In this manner, it is possible to adjust the hydrogen concentration of the anode circulation circuit 55. In the meanwhile, in the blockage progressing state in which the ice particles close the orifice 74 (phenomenon in FIG. 2B), discharging of the anode off gas from the anode circulation circuit 55 by the purge valve 72 is decreased. In particular, in the full blockage state in which, in particular, the ice particles completely close the orifice 74 (phenomenon in FIG. 2C), consequently, discharging of the anode off gas is stopped. Therefore, even if the purge valve 72 is opened/closed during production of the ice particles, the anode off gas is not discharged sufficiently, and concentration of the nitrogen gas contained in the anode off gas is increased in the anode circulation circuit 55. Then, as described above, it may be possible that the power generation performance of the fuel cell stack 14 may be lowered due to the shortage of hydrogen in the anode circulation circuit 55, to cause interruption of power generation (the decrease of the hydrogen concentration at the time point t2 to the time point t3 in FIG. 3 described later shows the change when the orifice 74 is closed during normal control).

As described above, the ice particles of the anode off gas are produced because the temperature of the auxiliary devices (anode discharge pipe 52, etc.) of the anode system apparatus 16 is lower than the temperature of the fuel cell stack 14. Therefore, as shown in FIG. 1, in the fuel cell system 10 according to the embodiment of the present invention, the control unit 22 is configured to obtain the coolant outlet temperature of the coolant outlet temperature sensor 49 and the anode outlet temperature of the anode outlet temperature sensor 62, and monitor the quantity of ice particles passing through the orifice 74 from the obtained data of the temperatures and the quantity of the purge gas. Further, the control unit 22 performs suitable processing in correspondence with the blocking state of the orifice 74 calculated from the quantity of ice particles at the time of starting operation at low temperature to suppress decrease in the hydrogen concentration of the anode circulation circuit 55.

Next, with reference to a graph of FIG. 3, a method of monitoring the ice particles (the blockage progressing state or the full blockage state of the orifice 74) by the coolant outlet temperature and the anode outlet temperature will be described. In the graph shown in FIG. 3, the lateral axis represents the time, and the vertical axis represents the temperature and the hydrogen concentration. In the graph, a thick line denotes the change of the coolant outlet temperature over time, a thin line denotes the change of the anode outlet temperature over time, and a one dot chain line denotes hydrogen concentration in the anode circulation circuit 55.

As can be understood from the graph, before starting operation of the fuel cell system 10 (start-up operation) at low temperature, both of the fuel cell stack 14 and the anode circulation circuit 55 are in substantially the same low temperature state (e.g., not higher than −10° C.). In this state, as a result of the start-up operation, the control unit 22 controls the anode system apparatus 16, the cathode system apparatus 18, and the coolant apparatus 20 to supply the anode gas and the cathode gas to the fuel cell stack 14, and circulates the coolant in the fuel cell stack 14. As a result, even in the initial stage of the start-up operation at low temperature, power generation is performed due to reactions of the anode gas and the cathode gas in the fuel cell stack 14. Then, as a result of power generation of the fuel cell stack 14, unreacted hydrogen gas and the nitrogen gas, and the produced water (water vapor or condensed liquid water) are discharged into the water discharge pipe 52.

The temperature of the fuel cell stack 14 itself is increased as a result of power generation from the start-up operation start time point to. Therefore, the temperature of the coolant outlet temperature of the coolant discharged from the fuel cell stack 14 is increased as well. On the other hand, the anode outlet temperature changes in the state where the increase speed of the temperature of the anode circulation circuit 55 at the initial state of the low temperature start-up operation is low. Further, since the fuel cell stack 14 is in the state of the freezing temperature or less (0° C. or less) from the time point t1 at the initial stage of the low temperature start-start-up operation, the water vapor contained in the anode off gas sublimates into ice particles.

Even if the coolant outlet temperature (temperature of the fuel cell stack 14) becomes higher than 0° C., as long as the anode outlet temperature (temperature of the anode circulation circuit 55) is not higher than 0° C., the ice particles of the anode off gas are produced. Further, as described above, the ice particles of the anode off gas move toward the purge valve 72, land on the wall 76 of the orifice 74, and gradually close the orifice 74.

In the anode circulation circuit 55, at the time point t2 where the quantity of the ice particles (ice particle quantity I) moving toward the purge valve 72 becomes not less than the predetermined quantity, the ice particles completely close the orifice 74. The ice particle quantity I of the ice particles accumulated in the orifice 74 can be calculated approximately from the following theory. The control unit 22 according to the embodiment of the present invention is configured to estimate (recognize) the time point t2 based on the calculated ice particle quantity I.

That is, the ice particle quantity of the ice particles moving toward the purge valve 72 per unit time corresponds to the quantity obtained by subtracting the saturation water vapor quantity of the anode circulation circuit 55 (anode saturation water vapor quantity AW) from the saturation water vapor quantity in the fuel cell stack 14 (stack saturation water vapor quantity SW). Further, the stack saturation water vapor quantity SW can be calculated by determining the stack saturation water vapor pressure from the coolant outlet temperature, and then, using data of the stack saturation water vapor pressure and the purge gas quantity PG. For example, the control unit 22 includes a map (not shown) where the coolant outlet temperature is associated with the stack saturation water vapor pressure, and suitably extracts the stack saturation water vapor pressure based on the coolant outlet temperature.

Further, the purge gas quantity PG can be calculated from the following equation (1), based on the blockage rate A of the orifice 74 which is a proportion at which the ice particles close the orifice 74, and the flow rate f of the purge valve 72.

$$PG = (1-A) \times f \qquad (1)$$

In this regard, the blockage rate A of the orifice 74 changes at a value lower than 100% in the blockage progression state (i.e., in the range of $0 \leq A < 1$). In the meanwhile, in the full blockage state of the orifice 74, the blockage rate A becomes the maximum (100%=1). It should be noted a fixed value (e.g., 0.5) may be used as the blockage rate A in the blockage progression state, and a variable value which changes in real time based on the calculated ice particles I may be used. Further, the flow rate f of the purge valve 72 can be calculated based on the supply quantity of the anode gas of the anode system apparatus 16 by a suitable expression (or a map, etc.).

On the other hand, the anode saturation water vapor pressure is determined from the anode outlet temperature, and the anode saturation water vapor quantity AW can be calculated from the anode saturation water vapor pressure and the purge gas quantity PG. Further, in the same manner as in the case of the stack saturation water vapor pressure, the control unit 22 has a map (not shown) where the anode outlet temperature is associated with the anode saturation water vapor pressure (not shown), and the control unit 22 extracts the suitable water vapor pressure based on the anode outlet temperature. Further, calculation of the purge gas quantity PG can be performed in the same manner as described above.

Further, the ice particle quantity I of the ice particles accumulated in the orifice 74 can be obtained by summation of the value calculated by subtracting the anode saturation water vapor quantity AW from the stack saturation water vapor quantity SW (ice particle quantity I of the ice particles moving toward the purge valve 72 per unit time) from the time point t1. That is, the ice particle quantity I of the accumulated ice particles can be calculated by the following equation (2)

$$I = \Sigma (SW - AW) \qquad (2)$$

Then, the control unit 22 can monitor the blockage progression state or the full blockage state of the orifice 74 based on the calculated ice particle quantity I. That is, the timing (time point t2 in FIG. 3) at which the ice particles completely close the orifice 74 is timing at which the ice particle quantity I of the ice particles moving toward the purge valve 72 becomes not less than a predetermined quantity. The control unit 22 holds a predetermined ice particle quantity threshold value Ith which was determined empirically by experiments, etc. (information of the quantity of the ice particles which close the orifice 74), and can estimate the time point t2 by comparing the ice particle quantity I and the ice particle quantity threshold value Ith. Therefore, the control unit 22 determines the blockage progression state in the period in which the ice particle quantity I is lower than the ice particle quantity threshold value Ith (time point t1 to time point t2 in FIG. 3), and when the control unit 22 determines that the ice particles quantity I is not less than the ice particle quantity threshold value Ith (time point t2), the control unit 22 recognizes the full blockage state of the orifice 74.

Further, as described above, the ice particles are produced in the case where the temperature of the environment around the fuel cell system 10 (vehicle 12) is not higher than predetermined temperature. Therefore, the control unit 22 has a temperature threshold value (freezing temperature threshold value Cth: see FIG. 1) of the temperature at which the ice particles are produced, and in the case where the anode outlet temperature becomes not higher than the freezing temperature threshold value Cth, it is possible to implement the low temperature control, and monitor the blockage progression state or the full blockage state in the low temperature control.

Figure 3:
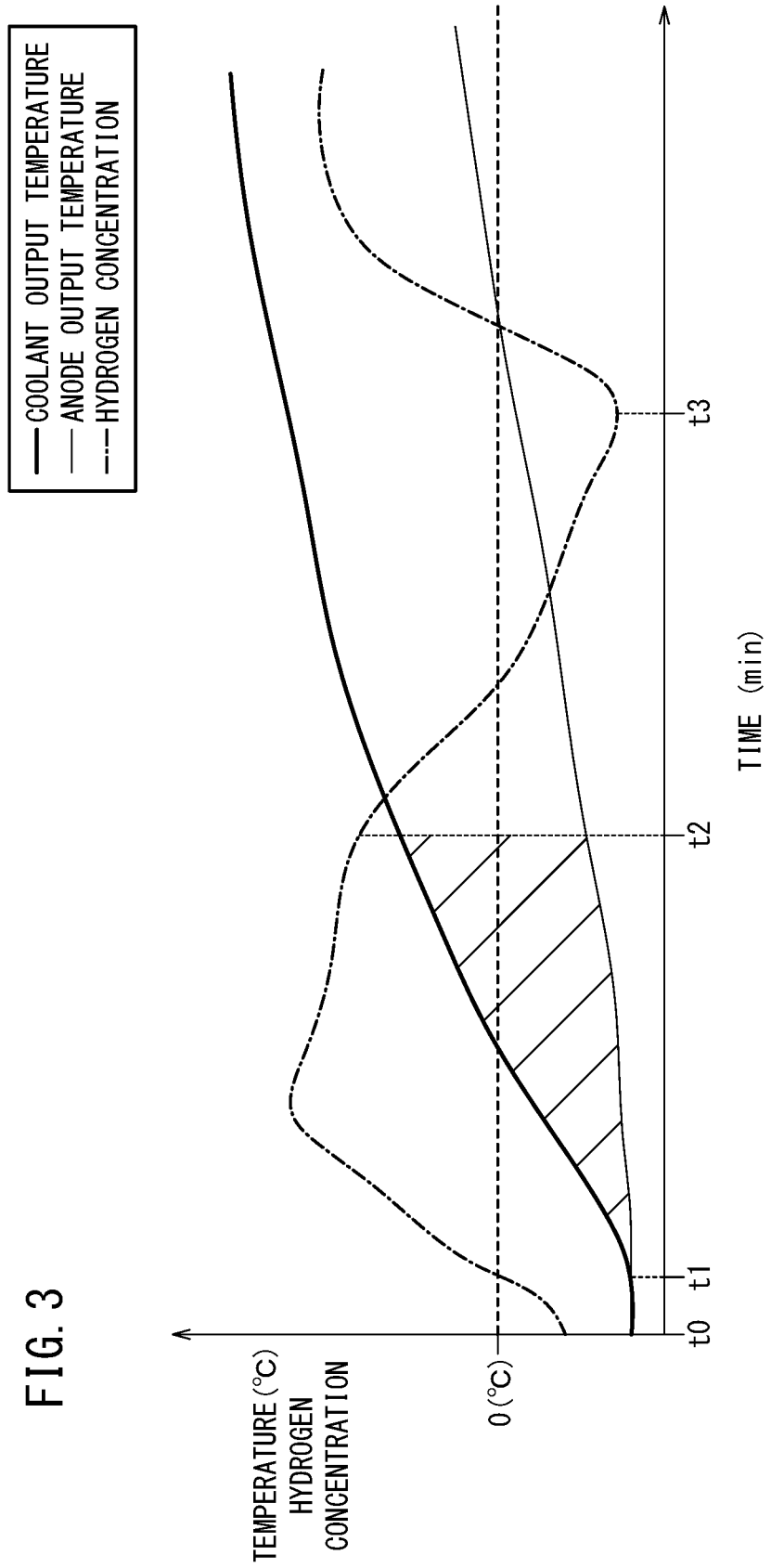
FIG. 3 is a graph showing the change of the coolant outlet temperature, the anode outlet temperature, and the conventional hydrogen concentration over time at the time of starting operation at low temperature.

Further, in FIG. 3, at the time point t3 where the anode outlet temperature becomes not lower than a predetermined temperature, closure of the orifice 74 by the ice particles is eliminated by defrosting the ice particles (therefore, after the time point t3, the hydrogen concentration is increased relatively due to the decrease in the nitrogen concentration). Therefore, the control unit 22 has a threshold value of the temperature at which the ice particles thaw (thawing temperature threshold value Dth: see FIG. 1), and when the anode outlet temperature becomes not lower than the thawing temperature threshold value Dth, monitoring of the ice particle state (low temperature control) is finished to implement the normal control.

Further, at the time of performing the normal control, the control unit 22 is configured to implement the hydrogen concentration estimation control for estimating the hydrogen concentration of the anode circulation circuit 55 based on the purge gas quantity PG. For example, the hydrogen concentration can be estimated by a known calculation method based on the quantity of hydrogen supplied from the injector 58 of the anode system apparatus 16, the power generation quantity of the fuel cell stack 14, the purge gas quantity PG, etc.

Figure 4:
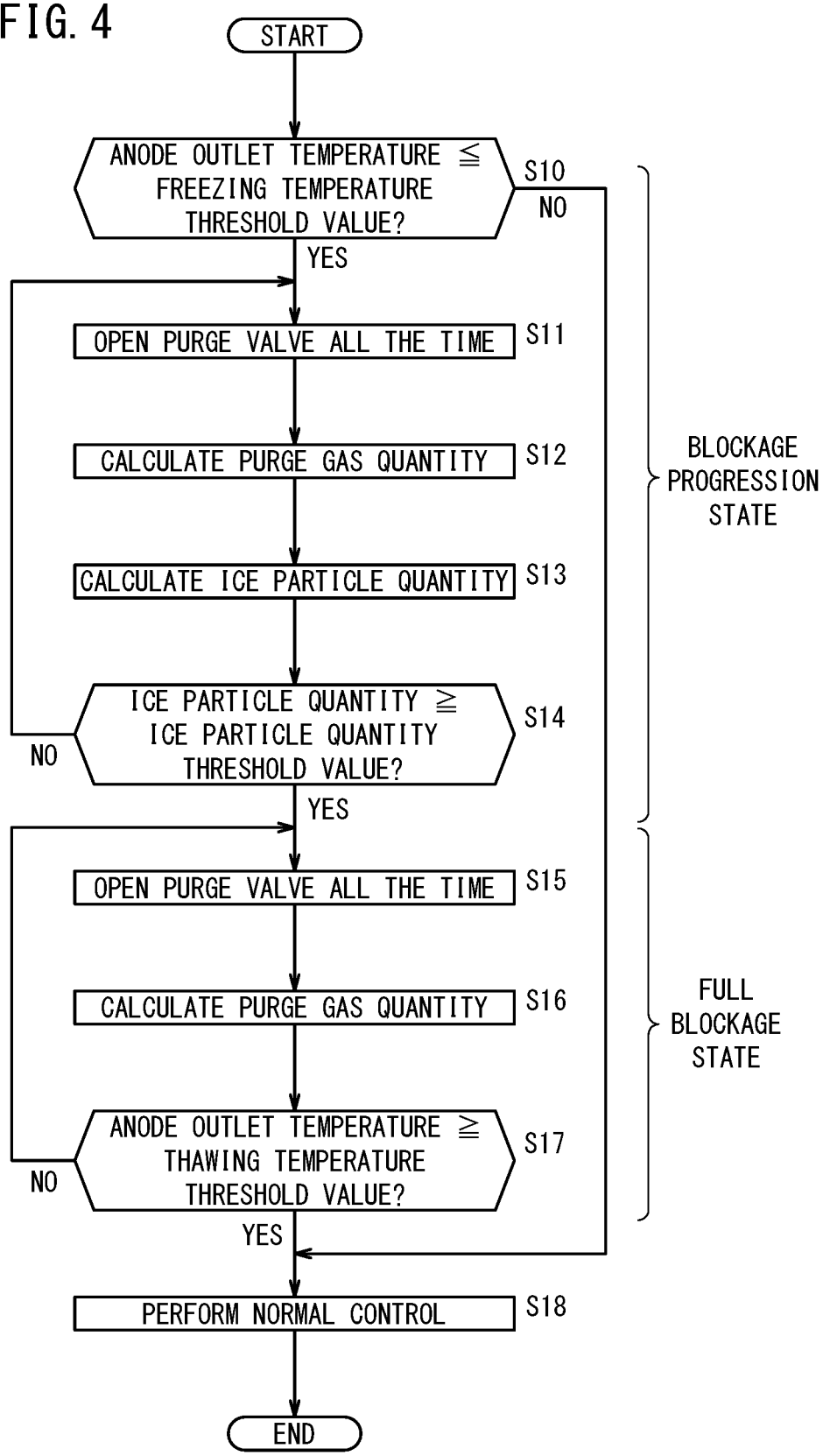
FIG. 4 is a flow chart showing a method of starting operation of the fuel cell system at low temperature.

The fuel cell system 10 according to the embodiment basically has the structure as described above. Hereinafter, a method of starting operation of the fuel cell system 10 at low temperature will be described with reference to a flow chart shown in FIG. 4.

Operation of the fuel cell system 10 is started by a start-up control input for starting operation, by a user of the vehicle 12. Therefore, the control unit 22 operates the anode system apparatus 16 to supply the anode gas to the fuel cell stack 14, and discharge the anode off gas from the fuel cell stack 14. Further, the control unit 22 operates the cathode system apparatus 18 to supply the cathode gas to the fuel cell stack 14, and discharge the cathode off gas from the fuel cell stack 14. As a result, in the fuel cell stack 14, the anode gas and the cathode gas are reacted inside the fuel cell stack 14 to induce reaction, and power generation is performed. Further, the control unit 22 operates the coolant apparatus 20 to circulate the coolant, and adjust the temperature of the fuel cell stack 14.

After starting power generation of the fuel cell stack 14, the method of starting operation of the fuel cell stack 14 at low temperature is performed. In the method of starting operation of the fuel cell stack 14 at low temperature, firstly, the control unit 22 obtains a detection signal from the anode outlet temperature sensor 62 of the fuel cell stack 14, and compares the anode outlet temperature and the freezing temperature threshold value Cth (step S10), in order to determine whether or not low temperature control corresponding to production of the ice particles should be performed. That is, in the case where the anode outlet temperature is not higher than the freezing temperature threshold value Cth (step S10: YES), the control unit 22 proceeds to step S11 to perform low temperature control. On the other hand, in the case where the anode outlet temperature is higher than the freezing temperature threshold value Cth (step S10: NO), the routine proceeds to step S18 to perform normal control.

In the low temperature control, the processes corresponding to the blockage progression state during the period in which the ice particles are closing the orifice 74 and the processes corresponding to the full blockage state where the ice particles completely close the orifice 74 are performed successively. For this purpose, in step S11 in the blockage progression state, the control unit 22 outputs an opening instruction to the purge valve 72 (purge valve drive unit (not shown)) to place the purge valve 72 in the constantly open state. That is, in the low temperature control, opening/closing switching of the purge valve 72 is not performed unlike the normal control, and the purge valve 72 is kept in the open state.

Further, the control unit 22 calculates the purge gas quantity PG using the above equation (1), based on the blockage rate A of the orifice 74 and the gas flow rate of the purge valve 72 (step S12). As described above, though a fixed value is used as the blockage rate A, a variable value based on the ice particle quantity I may be used as the blockage rate A.

Further, the control unit 22 calculates the ice particle quantity I using the above equation (2) based on the coolant outlet temperature and the anode outlet temperature obtained from the coolant outlet temperature sensor 49 and the anode outlet temperature sensor 62, respectively, and the calculated purge gas quantity PG (step S13). That is, the increase quantity of the ice particles accumulated in the orifice 74 (period of the blockage progression state) is estimated by accumulating (summing) the differentials between the stack saturation water vapor quantity SW and the anode saturation water vapor quantity AW.

Thereafter, the control unit 22 compares the calculated ice particle quantity I and the ice particle quantity threshold value Ith (step S14). In the case where the ice particle quantity I is smaller than the ice particle quantity threshold values Ith (step S14: NO), the routine returns to step S11 to continues the process of the blockage progression state, and on the other hand, in the case where the ice particle quantity I is not less than the ice particle quantity threshold value Ith (step S14: YES), the routine proceeds to step S15 to perform the processes of the full blockage state.

In step S15 in the full blockage state, the control unit 22 outputs an open instruction to the purge valve 72 (purge valve drive unit (not shown)), to continue from the blockage progression state to keep the purge valve 72 in the constantly open state. Further, it can be said that the orifice 74 is closed by freezing. Therefore, by setting the closure ratio A to 100%, the control unit 22 calculates the purge gas quantity PG as 0 from the above equation (1) (step S16).

Further, the control unit 22 determines whether or not the acquired anode outlet temperature is equal to or higher than the thawing temperature threshold value Dth (step S17). Then, in the case where the anode outlet temperature is lower than the thawing temperature threshold value Dth (step S17: NO), since the blocking state of the orifice 74 by the ice particles continues, the routine returns to step S15 to repeat the processes in the full blockage state. In the meanwhile, in the case where the anode outlet temperature is not lower than the thawing temperature threshold value Dth (step S17: YES), it can be said that the ice particles which closed the orifice 74 are defrosted. Therefore, the control unit 22 finishes the processes in the full blockage state, and proceeds to step S18.

In step S18, the control unit 22 performs normal control of the fuel cell system 10. In this case, the control unit 22 calculates the purge gas quantity PG in correspondence with the normal control, and performs control of opening/closing the purge valve 72 based on the calculated purge gas quantity PG and the hydrogen concentration. Therefore, the anode off gas is discharged from the anode circulation circuit 55 at the time of releasing the purge valve 72. When the purge valve 72 is closed, the anode off gas circulates the anode circulation circuit 55.

Further, in step S18 (normal control), the control unit 22 implements the hydrogen concentration estimation control by a predetermined method using the purge gas quantity PG. After the low temperature control is switched from low temperature control to the normal control, at the time of performing the low temperature control (blockage progression state and full blockage state), the control unit 22 calculates (monitors) the purge gas quantity PG accurately. As a result, it is possible to perform the hydrogen concentration estimation control with a greater degree of accuracy. Accordingly, it is possible to reliably achieve the power generation stability of the fuel cell system 10 after switching from the low temperature control to the normal control.

Figure 5:
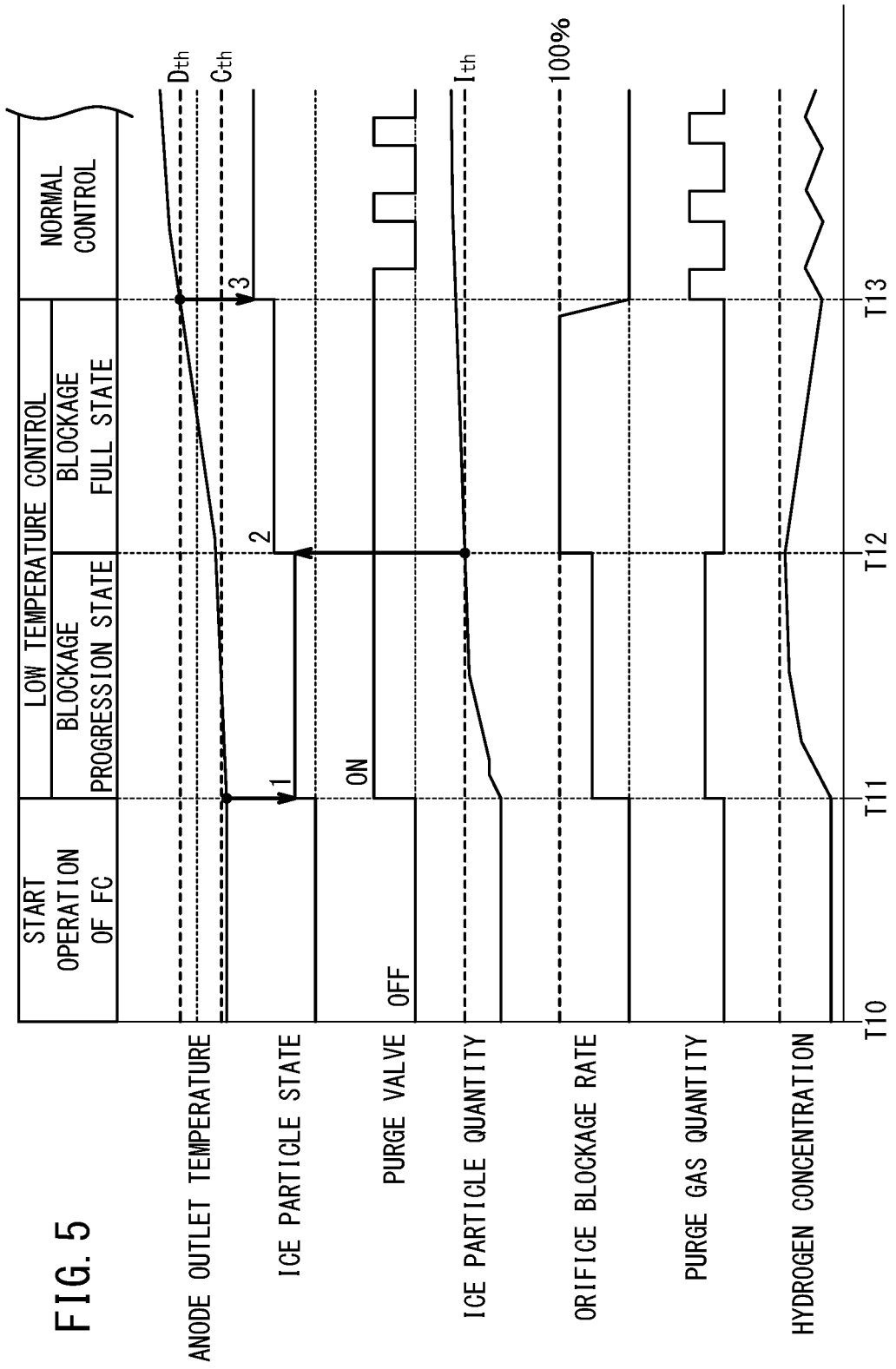
FIG. 5 is a timing chart showing the change of each parameter at the time of implementing low temperature control.

Next, setting/change of the parameters and the change of the hydrogen concentration in the anode circulation circuit 55 at the time of performing the method of starting operation of the fuel cell system 10 at low temperature will be described with reference to a timing chart in FIG. 5.

When operation of the fuel cell system 10 is started at the time T10 based on the user's control input to start operation of the vehicle 12, as described above, power generation of the fuel cell stack 14 is performed under control of the control unit 22. Then, the control unit 22 compares the anode outlet temperature and the freezing temperature threshold value Cth at the time point T11 after starting power generation of the fuel cell stack 14 (see step S10 in FIG. 4). Therefore, when the anode outlet temperature is not higher than the freezing temperature threshold value Cth, the control unit 22 starts the processes in the blockage progression state under low temperature control.

The control unit 22 has a status register for monitoring the ice particle state in the memory, and sets a status indicating the blockage progression state (1 in the illustrated embodiment). In the status of the blockage progression state, the purge valve 72 is placed in the constantly open state, and the anode off gas is discharged from the anode circulation circuit 55 through the purge valve 72. At this time, the blockage rate A of the orifice 74 becomes a predetermined value ($0 \leq A < 1$), and the purge gas quantity PG changes with a value greater than 0 accordingly.

Further, since the ice particles are produced in the anode off gas, the ice particle quantity I calculated by the control unit 22 increases gradually as well. Further, in the blockage progression state, the hydrogen concentration in the anode circulation circuit 55 is increased smoothly (relatively rapidly) since nitrogen is discharged from the anode circulation circuit 55 through the purge valve 72.

After the time T11, the control unit 22 monitors the ice particle quantity I, and at the time point T12 where the ice particle quantity I becomes the ice particle quantity threshold value Ith or more (see step S14 in FIG. 4), sets the status of the full blockage state (2 in the illustrated example) in the status register. In this manner, the control is switched to the process of the full blockage state.

In the status of the full blockage state, the control unit 22 continues the constantly open state of the purge valve 72. It should be noted that the blockage rate A of the orifice 74 is 100%, and the purge gas quantity PG becomes 0 accordingly. That is, the anode off gas of the anode circulation circuit 55 is no longer discharged from the purge valve 72.

Therefore, since the nitrogen is not discharged from the anode circulation circuit 55, the hydrogen concentration in the anode circulation circuit 55 is decreased gradually. However, since the purge valve 72 is placed in the constantly open state in the blockage progression state, at the time point T12, the hydrogen concentration is sufficiently high, and the decrease of hydrogen concentration at the time of performing the processes in the full blockage state becomes acceptable sufficiently.

In the fuel cell system 10, at the time point T13 where the anode outlet temperature is not lower than the thawing temperature threshold value Dth, the status of the normal control (3 in the illustrated embodiment) is set in the status register. As a result, the control is switched to the normal control. In the normal control, the control unit 22 opens/closes the purge valve 72 to perform switching between the discharge of the anode off gas from the anode circulation circuit 55 and circulation of the anode off gas. Therefore, the hydrogen concentration is increased/decreased at around concentration suitable for power generation of the fuel cell stack 14.

Preferably, at the time of starting normal control, the control unit 22 keeps the purge valve 72 open. As a result, when the control is switched from the low temperature control to the normal control, since the anode off gas containing nitrogen is discharged through the defrosted purge valve 72, it is possible to increase the hydrogen concentration which has been decreased in the full blockage state.

It should be noted that the present invention is not limited to the above described embodiment, and various modifications can be made in line with the gist of the present invention. For example, in the embodiment of the present invention, the control unit 22 compares the anode outlet temperature and the freezing temperature threshold value Cth to determine whether the low temperature control should be performed or the normal control should be performed. Alternatively, the control unit 22 may compare the coolant outlet temperature and the freezing temperature threshold Cth to determine whether the low temperature control should be performed or the normal control should be performed.

Technical ideas and advantages understood from the above embodiment will be described below.

According to first aspect of the present invention, a method of starting operation of a fuel cell system 10 at low temperature is provided. The fuel cell system 10 includes the fuel cell stack 14, the anode system apparatus 16 configured to circulate an anode gas between the fuel cell stack 14 and the anode system apparatus 16, and the purge valve 72 provided in the anode circulation circuit 55 of the anode system apparatus 16, the purge valve 72 has the orifice 74 for allowing the anode off gas discharged from the fuel cell stack 14 to flow through the orifice 74. The method includes the steps of detecting the temperature of the fuel cell system 10 by a temperature sensor (anode outlet temperature sensor 62), comparing a predetermined freezing temperature threshold value Cth with the detected temperature by a control unit 22, and performing low temperature control to place the purge valve 72 in the constantly open state in the case where the temperature is not higher than the freezing temperature threshold value Cth, and performing normal control for switching opening/closing of the purge valve 72 in the case where the temperature exceeds the freezing temperature threshold value Cth.

In the fuel cell system 10, in the case where the temperature of the temperature sensor (anode outlet temperature sensor 62) is not higher than the freezing temperature threshold value Cth, by placing the purge valve 72 in the constantly open state, it is possible to suitably perform power generation of the fuel cell stack 14 at the time of starting operation at low temperature. That is, in the fuel cell system 10, before the orifice 74 is blocked by the ice particles produced in the anode off gas in the low temperature control, it becomes possible to continuously and smoothly discharge the anode off gas containing nitrogen from the purge valve 72. Therefore, at the stage where the orifice 74 is blocked, the hydrogen concentration in the anode circulation circuit 55 becomes sufficiently high, and the fuel cell stack 14 can stably perform power generation by the hydrogen in the anode circulation circuit 55.

Further, at the time of performing low temperature control, the control unit 22 calculates the ice particle quantity I as a blocking state where the purge valve 72 is closed by ice particles produced by the anode off gas, and determines whether the purge valve 72 is in the blockage progression state or the full blockage state based on the ice particle quantity I. In this manner, it is possible to recognize the blocking state of the purge valve 72 accurately, and when the control unit 22 performs the hydrogen concentration estimation control after the end of the low temperature control, it becomes possible to significantly increase the accuracy of the hydrogen concentration estimation control.

Further, in the full blockage state, the control unit 22 compares the predetermined thawing temperature threshold value Dth and the temperature of the fuel cell system 10 with each other, and in the case where the temperature is lower than the freezing temperature threshold value Dth, the purge valve 72 is kept placed in the constantly open state, and in the case where the temperature is not lower than the freezing temperature threshold value Dth, the control is switched to the normal control. In the fuel cell system 10, by switching from the low temperature control to the normal control in the case where the temperature becomes not lower than the thawing temperature threshold value Dtn, it is possible to perform adjusting of the hydrogen concentration during power generation of the fuel cell stack 14.

Further, the ice particle quantity I is calculated based on accumulation of the saturation water vapor quantity of the water vapor passing through the orifice 74. In this manner, the control unit 22 can calculate the ice particle quantity I easily, and it is possible to increase the accuracy of determining whether the orifice 74 is in the blockage progression state or the full blockage state.

Further, as the temperature sensor, the fuel cell system 10 includes the coolant outlet temperature sensor 49 in the coolant discharge pipe 48 for discharging the coolant from the fuel cell stack 14 and the anode outlet temperature sensor 62 in the anode discharge pipe 52 for discharging the anode off gas from the fuel cell stack 14. Accumulation of the saturation water vapor quantity is performed based on a difference between the coolant outlet temperature detected by the coolant outlet temperature sensor 49 and the anode outlet temperature detected by the anode outlet temperature sensor 62. In this manner, the control unit 22 can easily perform accumulation of the saturation water vapor quantity.

Further, the control unit 22 compares the anode outlet temperature with the freezing temperate threshold value Cth to determine to perform the low temperature control or the normal control. In this manner, the fuel cell system 10 can suitably determine to perform the low temperature control or the normal control, based on the temperature of the anode off gas discharged from the fuel cell stack 14 and the ice particles are produced.

Further, accumulation of the saturation water vapor quantity is calculated using saturation water vapor quantity SW calculated based on the coolant outlet temperature and the purge gas quantity PG purged from the purge valve 72, and the anode saturation water vapor quantity AW calculated based on the anode outlet temperature and the purge gas quantity PG, and the purge gas quantity PG is calculated based on the blockage rate A of the orifice 74. Using the blockage rate A of the orifice 74, the control unit 22 can calculate the stack saturation water vapor quantity SW and the anode saturation water vapor quantity AW with a higher degree of accuracy.

Further, the control unit 22 performs control to open/close the purge valve 72 based on the calculated purge gas quantity PG at the time of performing the normal control. In the fuel cell system 10, as described above, it is possible to accurately calculate the purge gas quantity PG based on the blockage rate A of the orifice 74. Therefore, in the fuel cell system 10, by suitably performing opening/closing of the purge valve 72 during the normal control based on the purge gas quantity PG, it is possible to suitably manage the hydrogen concentration of the anode circulation circuit 55.

Further, a gas liquid separator 64 is provided on the upstream of the purge valve 72 of the anode circulation circuit 55, the gas liquid separator 64 is configured to separate a gas and liquid contained in the anode off gas, and ice particles produced by sublimation of water vapor move to the purge valve 72. In this manner, in the fuel cell system 10, it is possible to avoid freezing of the purge valve 72 due to movement of the liquid water, and even if the ice particles move from the gas liquid separator 64, it is possible to suitably monitor the blocking state of the orifice 74 by the above control.

Further, according to another aspect of the present invention, the fuel cell system 10 is provided. The fuel cell system 10 includes the fuel cell stack 14, the anode system apparatus 16 configured to circulate the anode gas between the fuel cell stack 14 and the anode system apparatus 16, and the purge valve 72 provided in the anode circulation circuit 55 of the anode system apparatus 16. The purge valve 72 has the orifice 74 for allowing the anode off gas discharged from the fuel cell stack 14 to flow through the orifice 74. Further, the fuel cell system 10 includes the control unit 22 configured to control opening/closing of the purge valve 72, and the temperature sensor (anode outlet temperature sensor 62) configured to detect temperature of the fuel cell system 10. The control unit 22 is configured to compare a predetermined freezing temperature threshold value Cth with the detected temperature, and perform low temperature control to place the purge valve in the constantly open state in the case where the temperature is not higher than the freezing temperature threshold value Cth, and perform normal control for switching opening/closing of the purge valve 72 in the case where the temperature exceeds the freezing temperature threshold value Cth.

In this manner, in the fuel cell system 10, even at temperature where the ice particles are produced, it is possible to suitably perform power generation of the fuel cell stack 14.

What is claimed is:

1. A method of starting operation of a fuel cell system at low temperature,
the fuel cell system comprising:
a fuel cell stack;
an anode system apparatus configured to circulate an anode gas between the fuel cell stack and the anode system apparatus; and
a purge valve provided in an anode circulation circuit of the anode system apparatus, the purge valve having an orifice for allowing anode off gas discharged from the fuel cell stack to flow through the orifice,
the method comprising:
detecting the temperature of the fuel cell system by a temperature sensor;
comparing a predetermined freezing temperature threshold value with the detected temperature by a control unit; and
performing low temperature control to place the purge valve in a constantly open state by keeping the purge valve open throughout the starting operation of the fuel cell system in case where the temperature is not higher than the freezing temperature threshold value, and performing normal control for switching opening/closing of the purge valve in a case where the temperature exceeds the freezing temperature threshold value.

2. The method of starting operation of the fuel cell system at low temperature according to claim 1, wherein at the low temperature control, the control unit calculates an ice particle quantity as a blocking state where the purge valve is closed by ice particles produced by the anode off gas, and determines whether the purge valve is in a blockage progression state or a full blockage state based on the ice particle quantity.

3. The method of starting operation of the fuel cell system at low temperature according to claim 2, wherein in the full blockage state, the control unit compares a predetermined thawing temperature threshold value and the temperature of the fuel cell system with each other; and
in a case where the temperature is lower than the freezing temperature threshold value, the purge valve is kept placed in the constantly open state, and in the case where the temperature is not lower than the freezing temperature threshold value, the control is switched to the normal control.

4. The method of starting operation of the fuel cell system at low temperature according to claim 2, wherein the ice particle quantity is calculated based on accumulation of a saturation water vapor quantity of water vapor passing through the orifice.

5. The method of starting operation of the fuel cell system at low temperature according to claim 4, wherein as the temperature sensor, the fuel cell system includes a coolant outlet temperature sensor in a coolant discharge pipe for discharging a coolant from the fuel cell stack and an anode outlet temperature sensor provided for an anode discharge pipe for discharging the anode off gas from the fuel cell stack,
wherein the accumulation of the saturation water vapor quantity is performed based on a difference between a coolant outlet temperature detected by the coolant outlet temperature sensor and an anode outlet temperature detected by the anode outlet temperature sensor.

6. The method of starting operation of the fuel cell system at low temperature according to claim 5, wherein the control unit compares the anode outlet temperature with the freezing temperature threshold value to determine to perform the low temperature control or the normal control.

7. The method of starting operation of the fuel cell system at low temperature according to claim 5, wherein the accumulation of the saturation water vapor quantity is calculated using saturation water vapor quantity calculated based on the coolant outlet temperature and a purge gas quantity purged from the purge valve, and an anode saturation water vapor quantity calculated based on the anode outlet temperature and the purge gas quantity; and
the purge gas quantity is calculated based on the blockage rate of the orifice.

8. The method of starting operation of the fuel cell system at low temperature according to claim 7, wherein the control unit performs control to open/close the purge valve based on the calculated purge gas quantity, in the normal control.

9. The method of starting operation of the fuel cell system at low temperature according to claim 1, wherein a gas liquid separator is provided on an upstream of the purge valve of the anode circulation circuit, the gas liquid separator is configured to separate a gas and liquid contained in the anode off gas, and ice particles produced by sublimation of water vapor move to the purge valve.

10. A fuel cell system comprising:
a fuel cell stack;
an anode system apparatus configured to circulate an anode gas between the fuel cell stack and the anode system apparatus;
a purge valve provided in an anode circulation circuit of the anode system apparatus, the purge valve having an orifice for allowing the anode off gas discharged from the fuel cell stack to flow through the orifice,
a control unit configured to control opening/closing of the purge valve; and
a temperature sensor configured to detect temperature of the fuel cell system,
wherein the control unit is configured to compare a predetermined freezing temperature threshold value with the detected temperature, and perform low temperature control to place the purge valve in a constantly open state by keeping the purge valve open throughout the starting operation of the fuel cell system in a case where the temperature is not higher than the freezing temperature threshold value and perform normal control for switching opening/closing of the purge valve in a case where the temperature exceeds the freezing temperature threshold value.

11. The fuel cell system according to claim 10, wherein the control unit is configured to calculate an ice particle quantity as a blocking state where the purge valve is closed by ice particles produced by the anode off gas at the low temperature and to determine whether the purge valve is in a blockage progression state or a full blockage state based on the ice particle quantity.

* * * * *